Jan. 7, 1941.   R. S. DRUMMOND   2,227,491
MACHINE FOR CUTTING GEARS
Filed June 14, 1937   2 Sheets-Sheet 1

INVENTOR
ROBERT S. DRUMMOND
BY
*Whittemore Hulbert & Belknap*
ATTORNEYS

Patented Jan. 7, 1941

2,227,491

UNITED STATES PATENT OFFICE 2,227,491

MACHINE FOR CUTTING GEARS

Robert S. Drummond, Detroit, Mich.

Application June 14, 1937, Serial No. 148,226

4 Claims. (Cl. 90—2)

This invention relates to gear finishing machines and more particularly to a machine of the type in which the gear to be finished is run in mesh, with axes crossed at an angle less than 30 degrees, with a finishing tool in the form of a gear having teeth conjugate to the teeth of the gear being cut and having sharp cutting edges on the faces of said teeth.

It is an object of the present invention to provide a machine of the general type mentioned suitable for finishing gears of relatively large sizes.

It is a further object of the invention to provide a gear finishing machine in which the gear to be finished is driven directly by a motor and which drives a tool through the intermeshing engagement of the gear and the tool.

It is a further object of the invention to provide a gear finishing machine having two tool supporting heads.

It is a further object of the invention to provide an improved method of finishing relatively large gears by a double head machine in which one head carries a roughing tool and the second head carries a finishing tool.

It is a further object of the invention to provide a double head gear finishing machine particularly adapted to finish both parts of a herringbone or similar gear.

Other objects will be apparent as this description proceeds, and when taken in connection with the accompanying drawings, in which Fig. 1 is a side elevation partly in section;

Figure 1:
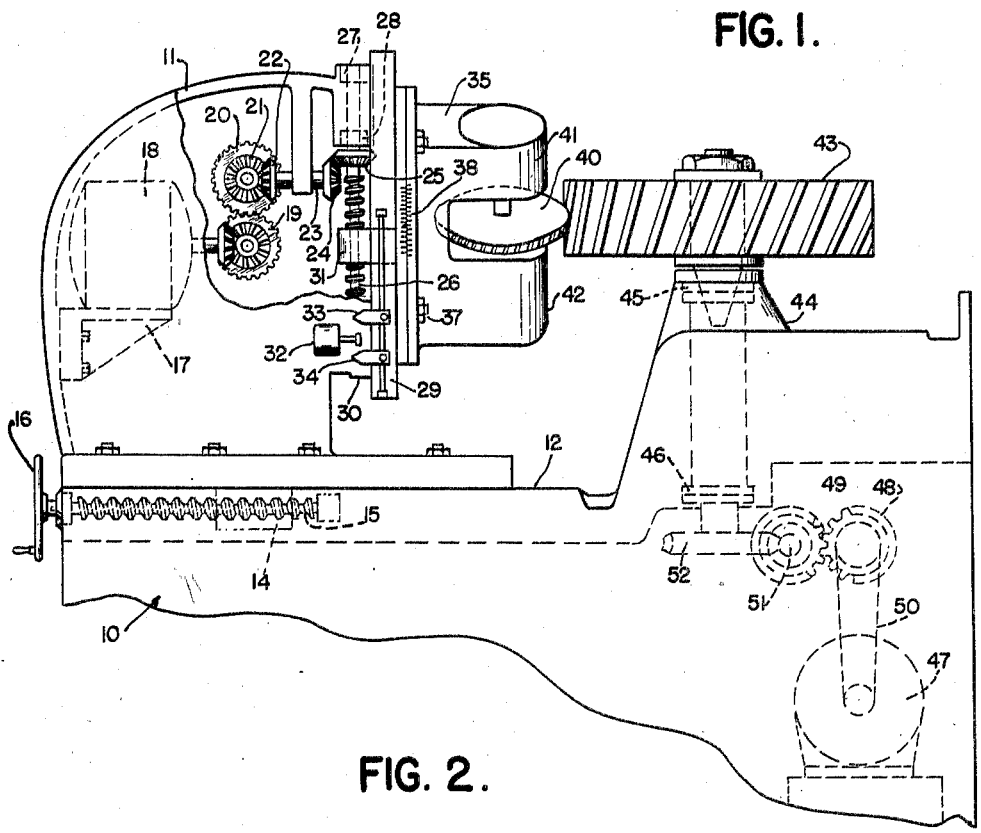

In this particular type of cutter it has been found that if the gear being finished is driven through intermeshing engagement by the tool, and if this work gear is of relatively large size, there is a possibility that the teeth on the cutter may be damaged or in some cases actually sheared off, due to the inertia of the relatively heavy work gear. This machine is designed to obviate this difficulty and to give improved results on relatively large gears. The capacity of this machine is such that gears from 24 to 60 inches outside diameter may be finished to the same high degree of accuracy as in my earlier machines, as described in my co-pending application Serial No. 95,252, filed August 10, 1936.

In the machine a base, generally indicated by the numeral 10, carries a cutter head support 11 which is mounted on ways 12 for horizontal feed. Depending from the support 11 is a nut portion 14 internally screw-threaded to receive a screw 15 which extends to the outside of the base 10, and it is provided with a hand wheel 16. As will be apparent, the rotation of this hand wheel will feed the support toward or away from the gear being finished. Mounted on a bracket 17 inside of the support 11 is an electric motor 18 which rotates a gear 19. Meshing with the gear 19 is a gear 20 connected to a bevel gear 21, which in turn meshes with a second bevel gear 22. Bevel gear 22 is connected through a shaft 23 to a bevel gear 24 which in turn meshes with a bevel gear 25. Directly connected to the bevel gear 25 is a screw-threaded member 26 supported by suitable bearings 27, 28.

Mounted on the support is a reciprocating slide 29 which is guided in ways 30 (see Fig. 3) for vertical reciprocation. Extending rearwardly from the reciprocating slide is a nut portion 31 provided with an internally screw-threaded aperture through which the member 26 extends in screw-threaded engagement therewith. Suitably connected to the motor 18 and motor 47 by an electric connection (not shown) is a switch 32 which is adapted to be actuated by stops 33 and 34 carried by the reciprocating slide. These stops 33 and 34 are adjustably mounted to limit reciprocation of the slide and upon either stop 33 or 34 actuating the switch 32, the motors 18 and 47 will be reversed. This reversal of the motor 18 is therefore accomplished at the end of each reciprocation and simultaneously therewith the motor 47 is also reversed so that at the end of each reciprocation, direction of rotation of the gear being finished is reversed.

Figure 2:
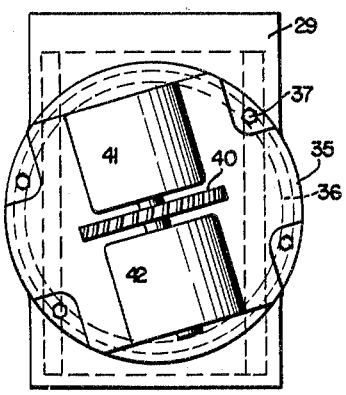
Fig. 2 is a front view of the swivel head and slide taken from the right of Fig. 1.
Figure 3:
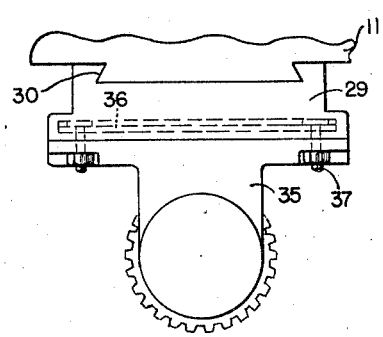
Fig. 3 is a horizontal section through Fig. 2, with the swivel rotated so that the axis of the cutter is vertical.

As more clearly shown in Figs. 2 and 3, a swivel head 35 is mounted on said reciprocating slide for adjustment about a horizontal axis. This adjustment is provided by suitable guiding means, and the swivel head is locked in adjusted position by bolts 37 engaging in circular T slots 36. A scale 38 is provided to indicate the angular adjustment of the swivel head.

It will be understood that the swivel adjustment of this head is for the purpose of setting the head at such an angle that the cutter which it carries will mesh with the teeth of the gear being cut with the axes crossed at an angle less than 30 degrees. The cutter 40 is in the form of a gear having cutting edges on the face of its teeth, as more fully described in my aforementioned co-pending application. The cutter is mounted for rotation between the heads 41, 42.

The gear to be finished, 43, is mounted on a suitable support 44 and is adapted to be driven in rotation. Suitable bearings, indicated at 45, 46, are provided to maintain the gear being finished absolutely rigid, except for its rotational motion. The gear is adapted to be rotated by a motor 47 which drives intermeshing gears 48 and 49 through the medium of a chain or belt 50. The gear 49 has connected thereto a worm 51 which meshes with the worm wheel 52 rigidly secured to the work spindle.

It is also contemplated that instead of the manual feed illustrated herein, an automatic feed substantially parallel in operation to the automatic feed illustrated and claimed in my co-pending application Ser. No. 95,252, filed August 10th, 1936, may be used. If desired, therefore, the reciprocation of the slide 29 may be, through suitable mechanism, adapted to rotate the screw 15 a predetermined amount at the end of each reciprocation. Whether an automatic feed is used or a manual feed is used, however, it should be noted that the tool may be fed toward the work by a predetermined definite amount and that it will be maintained rigidly spaced therefrom between such feeding movements. This construction is particularly advantageous in this type of cutter since by means of this a cut of predetermined depth may be taken at each reciprocation. Furthermore, this type of feed provides for readily correcting various errors that may occur in the gear to be cut. Particularly to be noted is eccentricity. If eccentricity exists in the gear to be cut, the cutting action will be established upon the feeding-in of the tool, first upon the high side of the gear, then in a progressively wider peripheral arc and finally when the eccentricity has been completely removed, the cutting action will be uniform around the entire periphery of the year. As in my co-pending application Serial No. 95,252, it is contemplated that vernier scales be provided to insure accuracy of setting and to make very slight corrections and changes in setting. This is necessary because finishing in this type of machine is accurate to a very high degree, accuracy within .0002 inch being obtained.

The operation of this machine is similar to the operation of the machine described in the co-pending application above mentioned. The work piece, which is solidly mounted in the support, is rotated directly through the gearing as above described. The rotation of the work piece causes corresponding rotation of the tool through the intermeshing engagement therewith. Besides its rotation, the tool has two other movements imparted to it. It is reciprocated in a vertical plane with an amplitude of reciprocation such that the finishing action is distributed evenly across the faces of the teeth of the gear being cut. At the end of each reciprocation the rotation of both motors 18 and 47 is reversed. This changes the direction of rotation of the gear being finished and necessarily of the finishing tool which is in mesh therewith, and also starts the vertical reciprocation of the tool carrying head in the opposite direction. Either manually or automatically, the support 11 is moved to the right in Fig. 1, causing the finishing tool to take a new cut across the faces of the teeth of the gear being cut.

Figure 4:
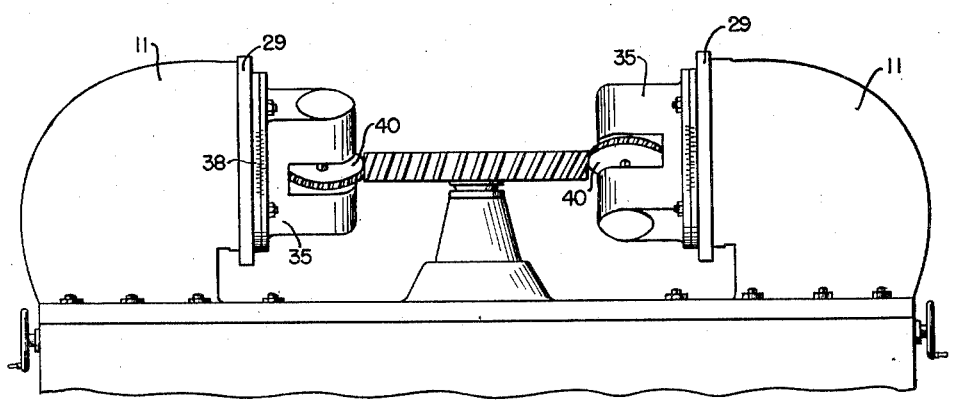
Fig. 4 is an elevation of a double head machine.
Figure 5:
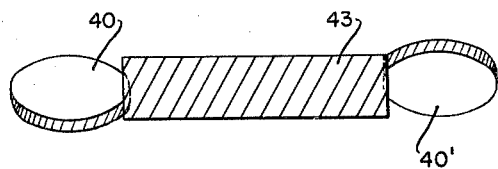
Fig. 5 is an elevation showing the operative engagement of two tools with a relatively large gear.

I have illustrated in Fig. 4 a gear finishing machine having two cutter head supports 11, reciprocating slides and swivel heads carrying cutter tools. The construction of each of these heads is the same as illustrated in Fig. 1 for the single head machine. In each head is mounted a motor and suitable gearing for reciprocating the slides 29 vertically and reversing switches, such as shown at 32 in Fig. 1. At the same time both supports may be mounted for horizontal feeding, either manually or automatically. In Fig. 5, I have illustrated the relationship between a gear 43 being cut and two cutting tools 40 and 40'. It is contemplated in this modification that one of these cutting tools, for example 40', may be a roughing tool.

In this type of gear finishing machine, the tool is in the form of a gear having teeth conjugate to the teeth of the gear being finished and provided with cutting edges on the face of the teeth. In this type of tool the difference between a roughing tool and a finishing tool is in the spacing of the cutting edges. Specifically, a finishing tool is formed by serrating the faces of the teeth. These serrations may be on the order of .035 to .045 inch in width and depth and may be spaced so as to provide intermediate lands of substantially the same width. The intermediate lands form guiding surfaces and as can be seen from the above dimensions, substantially half the width of the tooth is composed of guiding surfaces. A roughing tool differs from a finishing tool in that the serrations are substantially wider, while the width of land between the serrations remains substantially the same. The roughing cutter with the widened grooves will correct eccentricity, helix angle and index, but will not correct involute curvature to the same high degree of accuracy as will a finishing cutter.

In Fig. 5 the cutter 40' may be a roughing cutter and the cutter 40 may be a finishing cutter. The gear 43 is driven directly from a motor and drives the cutters 40, 40' through the intermeshing engagement therewith. Cutters 40' and 40 are reciprocated vertically, the amplitude of reciprocation being such that the finishing action of each is distributed entirely across the faces of the teeth of the gear being cut. Upon initiating rotation of the member of the gear 43 the roughing cutter 40' is preferably started in reciprocation slightly in advance of the reciprocation of the finishing cutter 40. This will result in a roughing cut being taken across the face of the teeth being cut followed immediately by a final finishing cut by the gear 40. This method of operation may be practiced manually or suitable automatic mechanism may be provided to insure maintaining the proper timed sequential operation of the two cutters.

Figure 6:
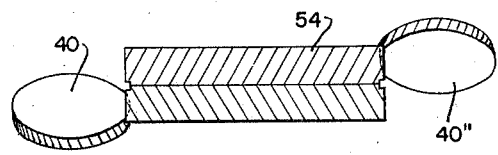
Fig. 6 is an elevation showing the operative engagement of two finishing tools with a herringbone gear.

I have illustrated in Fig. 6 a further method of cutting gears which may be practiced with the machine illustrated in Fig. 4. In this method the herringbone gear 54 is mounted on the work carrying spindle. This herringbone gear comprises two parts with teeth of equal but opposite helix angle. The double head machine is adapted to support a cutting tool in mesh with each part of the herringbone gear. When the herringbone gear 54 is rotated by its driving motor it will drive through the intermeshing engagement the cutters 40 and 40" which in this instance will preferably be finishing cutters. The cutting tools 40 and 40" will be automatically reciprocated vertically and may be fed inwardly either manually or automatically as in the single head machine. Suitable adjustable stop means will be provided to reverse reciprocation of each cutter after it reaches the edge of the section of the herringbone gear which it is cutting. In this manner both sections of the herringbone gear can be quickly and accurately finished to correct shape in a single operation.

While particular modifications of my machine have been fully described, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. A machine for finishing gears, comprising a frame, a support mounted for lateral adjustment on said frame, a head on said support mounted for adjustment about a horizontal axis and reciprocation in a vertical plane, mounting means in said head for supporting a gear-shaped tool for free rotation, means on said frame for supporting a gear to be finished for rotation about a vertical axis, said means being so related that the gear and tool will mesh with their axes in no common plane and crossing at an angle of less than 30 degrees, and means for rotating said gear directly and said tool through its meshed engagement with said gear, a motor carried by said support for causing reciprocation of said head in a vertical plane.

2. A machine for finishing gears, comprising a frame, a support mounted for lateral adjustment on said frame, a head on said support mounted for adjustment about a horizontal axis and reciprocation in a vertical plane, mounting means in said head for supporting a gear-shaped tool for free rotation, means on said frame for supporting a gear to be finished for rotation about a vertical axis, said means being so related that the gear and tool will mesh with their axes in no common plane and crossing at an angle of less than 30 degrees, motor means carried by said frame for rotating said gear directly and said tool through its meshed engagement with said gear, a motor carried by said support for causing reciprocation of said head in a vertical plane, and automatic means for reversing rotation of said gear at the end of each reciprocation.

3. A machine for finishing a relatively heavy gear which comprises: a rigid frame; work supporting means on said frame including a work spindle mounted in said frame for rotation only; a motor carried by said frame for rotating said work spindle; a tool support on said frame mounted for adjustment toward and away from said work spindle, for angular adjustment thereon in a plane parallel to the axis of said work spindle, and for translation in said plane in a direction parallel to the axis of the work spindle to spread the finishing action of said tool from end to end of the teeth of said gear; said tool support including a tool spindle for supporting a gear-shaped tool for free rotation; a tool on said spindle; said work spindle and tool spindle being so related that a work gear and tool carried thereby will mesh with their axes in no common plane and crossed at an angle of less than 30°; and motor means for causing slow translation of said tool support in said plane to distribute the finishing action of said tool from end to end of the teeth of said gear.

4. A machine for finishing a relatively heavy gear which comprises: a rigid frame; work supporting means on said frame including a vertical work spindle mounted in said frame for rotation only; a motor carried by said frame for rotating said work spindle; a tool support on said frame mounted for adjustment toward and away from said work spindle, for angular adjustment thereon in a plane parallel to the axis of said work spindle, and for translation in said plane in a vertical direction parallel to the axis of the work spindle to spread the finishing action of said tool from end to end of the teeth of said gear; said tool support including a tool spindle for supporting a gear-shaped tool for free rotation; a tool on said spindle; said work spindle and tool spindle being so related that a work gear and tool carried thereby will mesh with their axes in no common plane and crossed at an angle of less than 30°; and motor means for causing slow translation of said tool support in said plane to distribute the finishing action of said tool from end to end of the teeth of said gear.

ROBERT S. DRUMMOND.